United States Patent [19]

Campbell

[11] Patent Number: 4,559,014
[45] Date of Patent: Dec. 17, 1985

[54] MOTION LIMITING SYSTEMS

[75] Inventor: Douglas R. Campbell, Glasgow, Scotland

[73] Assignee: Rediffusion Simulation Limited, Crawley, England

[21] Appl. No.: 496,509

[22] Filed: May 20, 1983

[30] Foreign Application Priority Data

May 25, 1982 [GB] United Kingdom ............... 8215218

[51] Int. Cl.$^4$ ............................................. G09B 9/08
[52] U.S. Cl. ..................................................... 434/58
[58] Field of Search ....................... 434/45, 46, 47, 55, 434/57, 58, 59

[56] References Cited

U.S. PATENT DOCUMENTS 3,295,224 2/1971 Cappel ................................. 434/58
4,019,261 4/1977 Pancoe .................................. 434/58

Primary Examiner—Richard C. Pinkham
Assistant Examiner—Vincent A. Mosconi
Attorney, Agent, or Firm—Laurence R. Brown

[57] ABSTRACT

A system and method for limiting the motion of the motion platform of a vehicle simulator in which the motion platform is supported on a plurality of extensible members, the extension of the members being controlled by commands initiated by a user of the simulator. At least one absolute limit is set for at least one parameter such as position or velocity of the extension of each of the members, and the parameter is maintained within the limit. The commanded or actual magnitude of the parameter is monitored for each member relative to that members absolute limit, the member for which the monitored relative magnitude is the greatest is determined, and the limit determined for each of the other members is scaled down such that a movement of the motion platform which causes the parameter for any one member to reach its absolute limit also causes each of the other members to reach its scaled down limit at the same time.

7 Claims, 9 Drawing Figures

MOTION LIMITING SYSTEMS

The present invention relates to a system and method for limiting the motion of the motion platform of a vehicle simulator.

Vehicle simulators comprise a motion platform which moves in response to the manipulation of the simulator controls in a manner which simulates as closely as possible the movements which would be imparted to a real vehicle if its controls were similarly manipulated. In the case of an aircraft simulator, the simulator has to produce effects equivalent to for example acceleration and pitch.

It is known to mount simulator motion platforms on a system of hydraulic jacks providing for example six degrees of freedom. Examples of such systems are described in British Patent Specification Nos. 1 224 505 and 1 350 941 which illustrate systems in which movements of the platform are controlled by six hydraulic jacks. The maximum and minimum extensions of the jacks are obviously limited and the maximum velocity of the jacks is also limited by the rate at which the hydraulic system can deliver or exhaust hydraulic fluid. Thus it is not possible to faithfully simulate all movements of the aircraft being simulated.

For example, an acceleration can only be simulated for a limited period of time. In conventional systems, when the simulator user demands (by manipulation of the simulator controls) a particular jack extension or velocity, the jack responds until it reaches a limit determined by its physical characteristics or by control devices. The jack can no longer respond to the demands made upon it and the simulator user perceives a jerk in the movement of the platform as a result of the discontinuity in the jacks performance.

To overcome the problems of "hard" limiting as described above, "soft" limiting systems have been designed in which as the jack approaches its limit its response to the demands made upon it becomes nonlinear. For example, in a soft position limit system, as the jack approaches its maximum extension limit in response to a constant velocity demand its velocity in fact reduces smoothly to zero at the limit rather than dropping abruptly from the demanded velocity to zero at the limit.

A further problem with known simulators is that of jack limit cross-coupling effects. For example, if the motion platform is displaying a steady tilt and is required to accelerate vertically whilst maintaining this tilt, one or more of the jacks will reach its limit of extension before the others. The extension of the limited jack or jacks will thus stop but the other jacks will continue to extend until they all reach their limits. This will result in the platform assuming a horizontal position even though it should still be tilted. The simulator operator thus experiences an erroneous tilting effect. This erroneous effect occurs with hard and soft limit systems, although it is more complex in soft limit systems where even if none of the jacks is at its absolute limit some of them may be operating in non-linear soft-limit regions. Indeed, one effect of using a soft limit system is that the non-linear soft limits reduce the range of jack extensions within which manoeuvres are faithfully simulated.

A further feature of aircraft simulators is that after a manoeuvre has been simulated it is necessary to return the motion platform to a "normal" position so that subsequent manoeuvres can be simulated. This means that the effects of any manipulation of the controls must be gradually cancelled or "washed out". This has been achieved in the past using washout damping filters. Attempts have been made to overcome cross-coupling jack limit problems by increasing the washout filter damping factor. Since the damping factor effectively determines the amount of velocity feedback in the washout filter, and the centroid velocity is related to the jack velocities, it is not surprising that adjusting the damping factor affects cross-coupling. Unfortunately such adjustments to the damping factor result in the simulator feeling sluggish and therefore do not represent a real solution to the problem.

According to the present invention there is provided a system for limiting the motion of the motion platform of a vehicle simulator in which the motion platform is supported or suspended on a plurality of extensible members, the extension of the members being controlled by commands initiated by a user of the simulator, comprising means for determining at least one absolute limit for at least one parameter of the extension of each of the members, and means for maintaining said at least one parameter within said at least one limit, characterised by means for monitoring the commanded or actual magnitude of said parameter in respect of each member relative to the said absolute limit for that member, means for determining the member for which the monitored relative magnitude is the greatest, and means for scaling down the said absolute limit determined for each of the other members such that a movement of the motion platform which causes said parameter for any one member to reach its absolute limit also causes each of the other members to reach its scaled down limit at the same time.

The invention also provides a method for limiting the motion of the motion platform of a vehicle simulator in which the motion platform is supported on a plurality of extensible members, the extension of the members being controlled by commands initiated by a user of the simulator, wherein at least one absolute limit is determined for at least one parameter of the extension of each of the members, and said at least one parameter is maintained within said at least one limit, characterised in that the commanded or actual magnitude of said parameter is monitored in respect of each member relative to the said absolute limit for that member, the member for which the monitored relative magnitude is the greatest is determined, and the said absolute limit determined for each of the other members is scaled down such that a movement of the motion platform which causes said parameter for any one member to reach its absolute limit also causes each of the other members to reach its scaled down limit at the same time.

The invention enables a limiting system to be provided which avoids jack limit cross-coupling without compromising measures taken to soft-limit the jacks and to washout previously commanded instructions.

The monitored parameter may be the positional extension of the member and/or its velocity of extension.

A variable limit function generator may be provided for each member the output of which controls an actuator drive system for the respective member, the function generators of all the members being controlled by means for calculating a scale factor for the members. The calculating means may be connected to an actuator command signal source responsive to the controls of the simulator or to outputs of the extensible members representative of said parameter. The system may thus monitor the commands to the members or the actual position and/or velocity of the members.

Embodiments of the present invention will now be described, by way of example, with reference to the accompanying drawings, in which.

Figure 1:
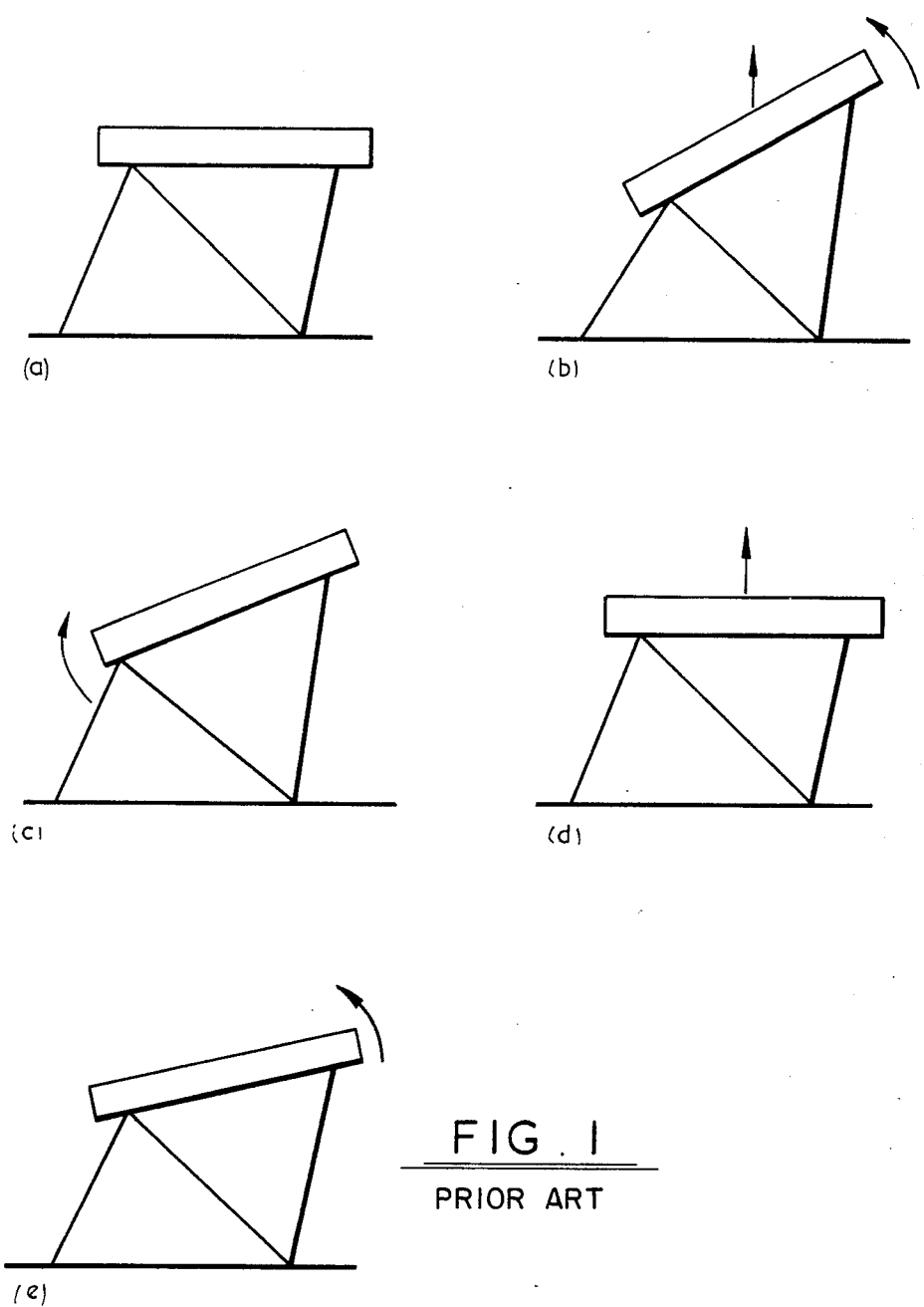
FIG. 1 illustrates cross-coupling limit effects experienced with conventional systems.

FIG. 1 illustrates the effect of velocity limiting on a motion system having six jacks (6 degrees of freedom). If the platform is sitting level at the neutral point (FIG. 1a) and the pilot demands a pitch up of the aircraft as at "rotate", a combined pitch and heave motion will result (FIG. 1b). The combined pitch and heave motion will cause the front jacks to velocity limit before the others. The rear jacks will keep accelerating (FIG. 1c) until they reach their velocity limit which means that the platform, from being in an initially pitched up attitude, will now be approaching horizontal (FIG. 1d). As washout of the original "rotate" demand proceeds the simulator will recover and attempt to reproduce the now steady aircraft (climb) attitude (FIG. 1e). Thus the simulator will pitch up again to take up a steady state pitch angle.

It is generally accepted that the human being is not adept at judging the absolute magnitude of accelerations but is very sensitive to the direction of the acceleration. Thus at all times attempts should be made to maintain the directional fidelity of the acceleration "cue".

This requires of the controlling system that, (a) until a jack reaches its velocity limits, no limit should be placed on it or the other jacks if possible
(b) once a jack has reached its velocity limit the other jacks must not be allowed to continue accelerating unless a directional change in the cue is demanded.

The first condition implies that at each iteration the demanded jack velocities (jack increments), must be checked, the largest modulus must be isolated, and if this exceeds a predetermined limit that velocity must be replaced by the limit velocity. The second condition demands that the remaining jacks be maintained at the velocity they had when the velocity limit was breached, i.e. they must be artificially velocity limited so that all six jacks velocity limit at the same time. It is not enough however to "freeze" all jack velocities once the limit has been reached since this would not allow subsequently demanded changes of cue direction to be displayed until washout had reduced the limiting jack to beneath the limit velocity.

A desired change of cue direction while at least one jack is actually at the limit velocity can be allowed if a scaling process is used instead of a "freeze". If demanded jack velocities are, $$V_1, V_2, V_3, V_4, V_5, V_6$$

and say, $$|V_3| > |V_{LIM}| > |V_1|, |V_2|, |V_4|, |V_5|, |V_6|$$

where $$V_1/|V_3| = k_1, V_2/|V_3| = k_2, V_4/|V_3| = k_4$$

$$V_5/|V_3| = k_5, V_6/|V_3| = k_6,$$

and $|V_{LIM}|$ is the modulus of the predetermined limit velocity.

In order to maintain the direction of the cue it is necessary for each jack velocity to maintain the same fraction $k_N$ of the limited velocity as it had of the largest velocity $V_3$. Thus the new values of velocity must be, $$V_1^1 = k_1 |V_{LIM}| = V_1 \frac{|V_{LIM}|}{|V_3|} = kV_1$$

$$V_2^1 = k_2 |V_{LIM}| = V_2 \frac{|V_{LIM}|}{|V_3|} = kV_2$$

$$V_3^1 = (\text{sign of } V_3) \cdot |V_{LIM}| = kV_3$$

$$V_4^1 = k_4 |V_{LIM}| = V_4 \frac{|V_{LIM}|}{|V_3|} = kV_4$$

$$V_5^1 = k_5 |V_{LIM}| = V_5 \frac{|V_{LIM}|}{|V_3|} = kV_5$$

$$V_6^1 = k_6 |V_{LIM}| = V_6 \frac{|V_{LIM}|}{|V_3|} = kV_6$$

where $$k = |V_{LIM}|/|V_3|$$

Figure 2:
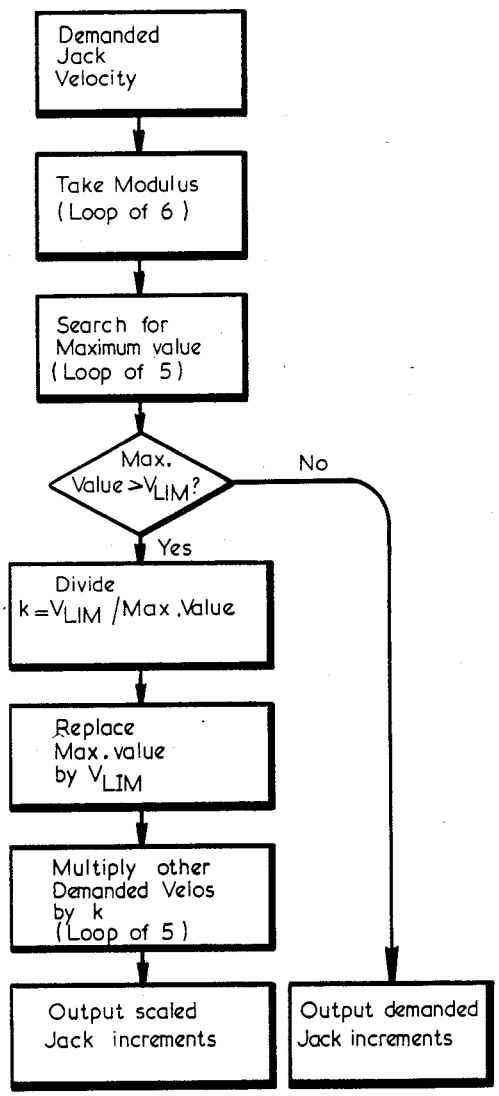
FIG. 2 is a flow chart of a procedure according to the invention.

There is nothing to prevent the relative magnitude of the demanded jack velocity from changing in response to a demanded change in cue direction. A flow chart of this procedure is shown in FIG. 2.

As an example of the operation of this limiting procedure, if the motion platform is in the process of delivering a constant direction acceleration cue to the simulator pilot, as the jacks accelerate the modulus of the highest velocity will be compared with the limit velocity. When this limit is exceeded the output to that jack will remain at the limit value and the other jacks will retain the velocity they had at the moment that limiting occurred. Thus the cue direction will not change due to velocity limiting of one or more jacks but only if a demanded change of cue direction occurs to vary the proportions $k_N$.

This procedure avoids spurious cueing due to velocity limiting, but does not modify the washout filters which can be set up independently to take care of their prime function, i.e. reduction of the demanded cue in a controlled fashion.

Figure 3:
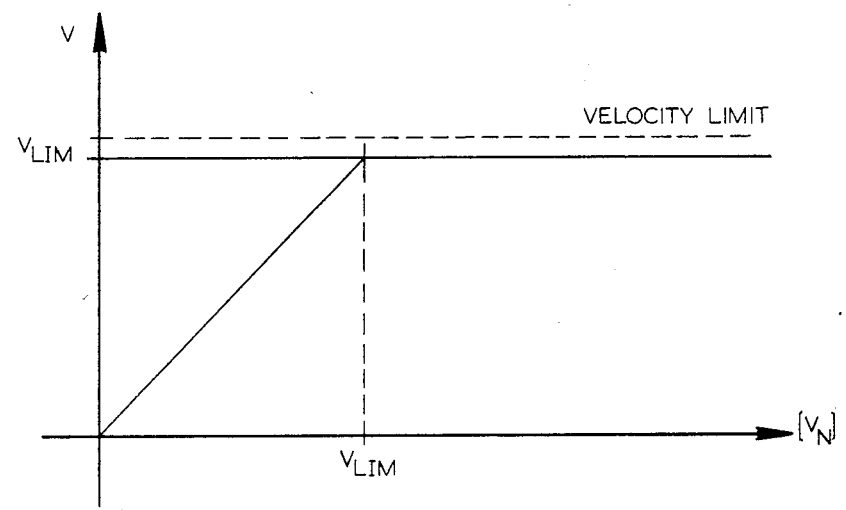
FIG. 3 illustrates the effects of a hard limit system.
Figure 3:
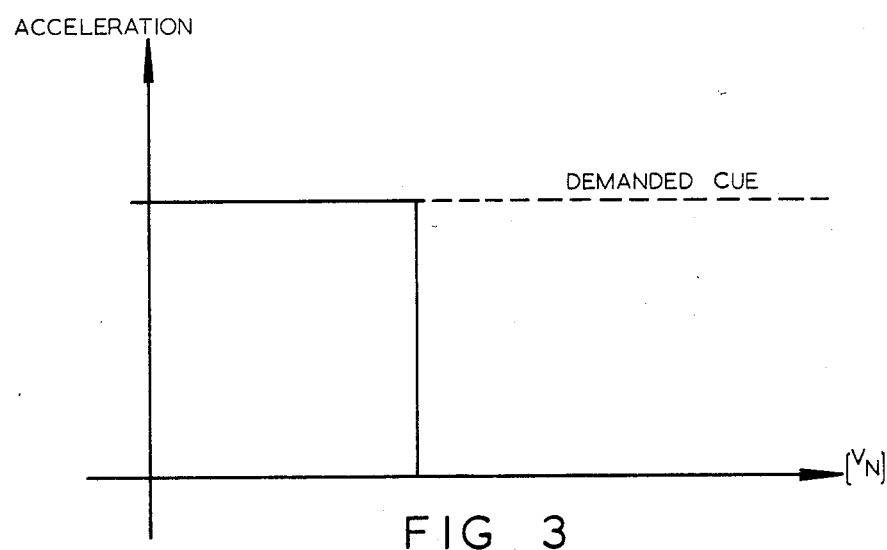

One problem which might be experienced with the scheme is pilot detection of jerk due to velocity limiting. In FIG. 3 graphs are shown of the behaviour of a jack subject to a constant demanded acceleration. The jack velocity increases up to the limit $V_{LIM}$ (set just below the limit determined by the physical characteristics of the device) and then limits abruptly. A soft limiting scheme is therefore preferably introduced.

Sinusoids are commonly used as soft limiters. The soft velocity limit $V_{LIMS}$, instead of being set as a hard limit, $V_{LIM}$ is calculated using the largest jack velocity $|V_N|$ via some function such as $$|V_N|_{LTD} = \frac{\pi}{2}\left[\frac{V_N}{\frac{\pi}{2}V_{LIM}}\right] \text{ LIMITED } \leq_0^1$$

$$V_{LIMS} = V_{LIM} \sin(|V_N|_{LTD})$$

Figure 4:
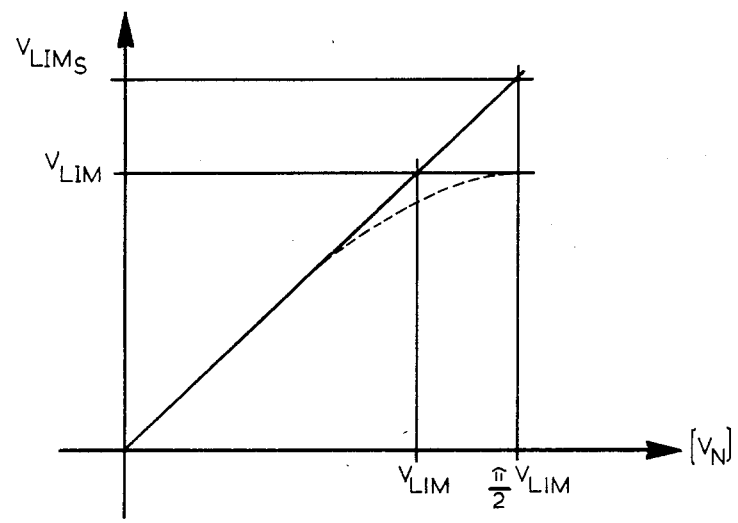
FIGS. 4 and 5 illustrate the operation of a soft limit system.

This limits as shown in FIG. 4.
At low velocities, i.e. small angles $$V_{LIMS} = V_{LIM}\frac{|V_N|}{V_{LIM}} = |V_N|$$

and no limiting takes place. At higher velocities the sine curve departs from linear behaviour and the value of the velocity limit $V_{LIMS}$, to be used in place of $V_{LIM}$ (FIG. 2), becomes gradually more restrictive.

Figure 5:
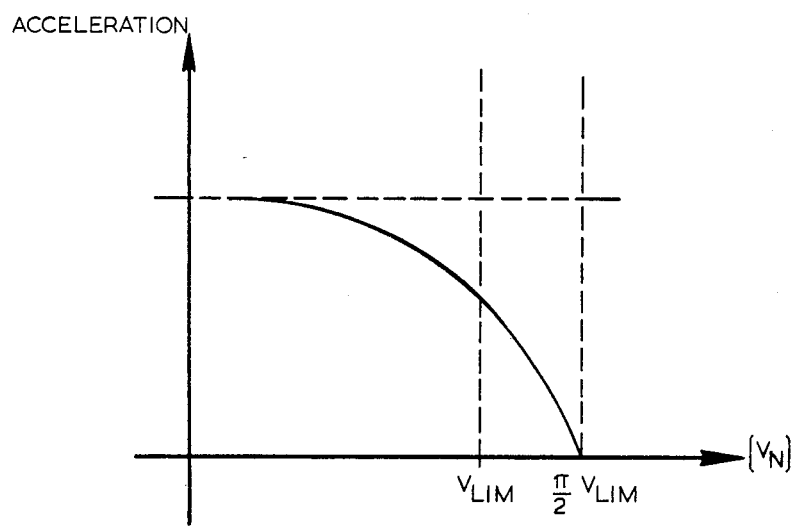
Figure 6:
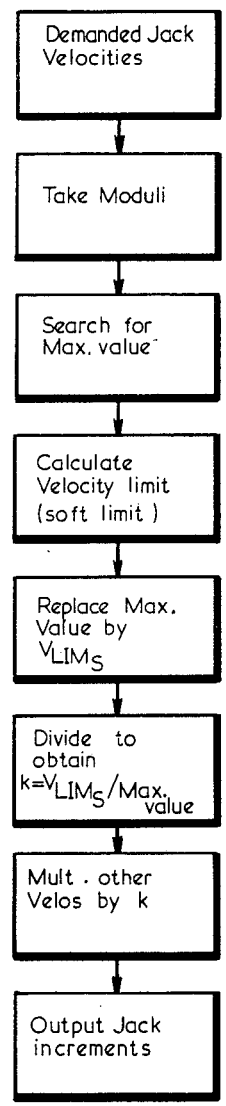
FIG. 6 is a flow chart of the soft limit system.

The change in acceleration due to this limiting is no longer abrupt but follows a cosine curve as shown in FIG. 5. Thus jerk due to sudden changes in acceleration is reduced. A flow chart for the soft limit procedure is shown in FIG. 6.

All the procedures for velocity limiting can be applied in an essentially unmodified form to position limiting. Obviously if one jack position limits before others a spurious tilt and rotation cue will be delivered to the pilot. Thus the other jacks must be position limited artificially at the same time as the jack with maximum extension reaches its extension limit.

In one known simulator a soft limit identical to FIG. 4 is set on jack extension but no attempt is made to control jacks not approaching the limit. Similar behaviour to that resulting from velocity limiting can therefore occur. For example, if a pitch and heave is demanded, as at "rotate", and it is of sufficient magnitude that the demanded front jack extensions enter the non-linear soft limit region, then the rear jacks will extend proportionately more than the front since they are still operating in the linear part of the curve. Thus the rear of the platform will tend to catch up with the front producing a spurious pitch down tendency. The eventual attainment of aircraft attitude will result in the rear of the platform dropping giving a spurious pitch up.

By replacing all references to velocities by position in the procedures described above the necessary limiting scheme is produced.

Figure 7:
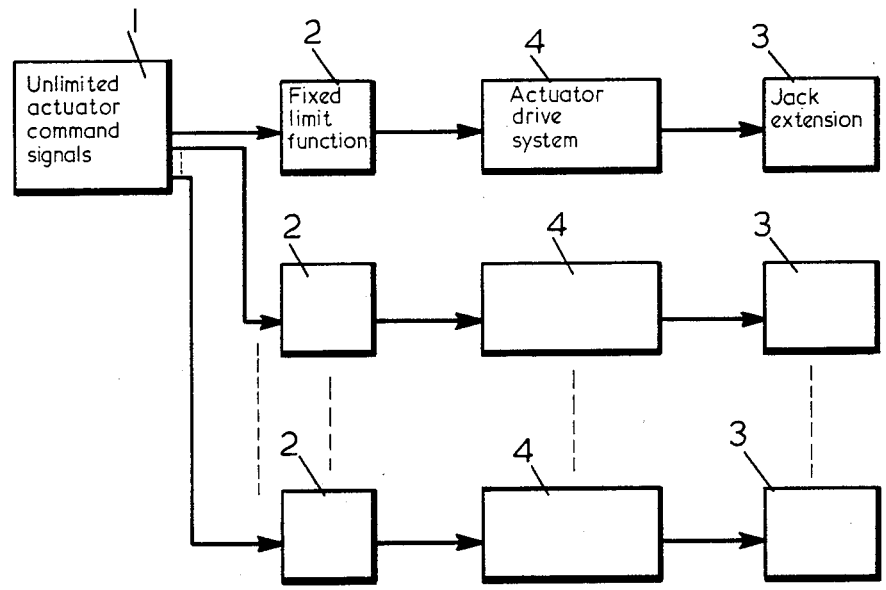
FIG. 7 is a schematic illustration of a prior art limiting system.

FIG. 7 schematically illustrates the structure of a conventional simulator in which each jack is independently position and/or velocity limited. The user-operated controls 1 supply unlimited actuator command signals to a fixed limit function generator 2 in respect of each jack 3. Each jack 3 is controlled by an actuator drive system 4 which responds to the output of the fixed limit function generator 2. Thus the jack extensions follow the command signals unless those command signals are limited by the function generators 2. Limiting of the command signals to one jack actuator has no effect on the command signals to the other jack actuators.

Figure 8:
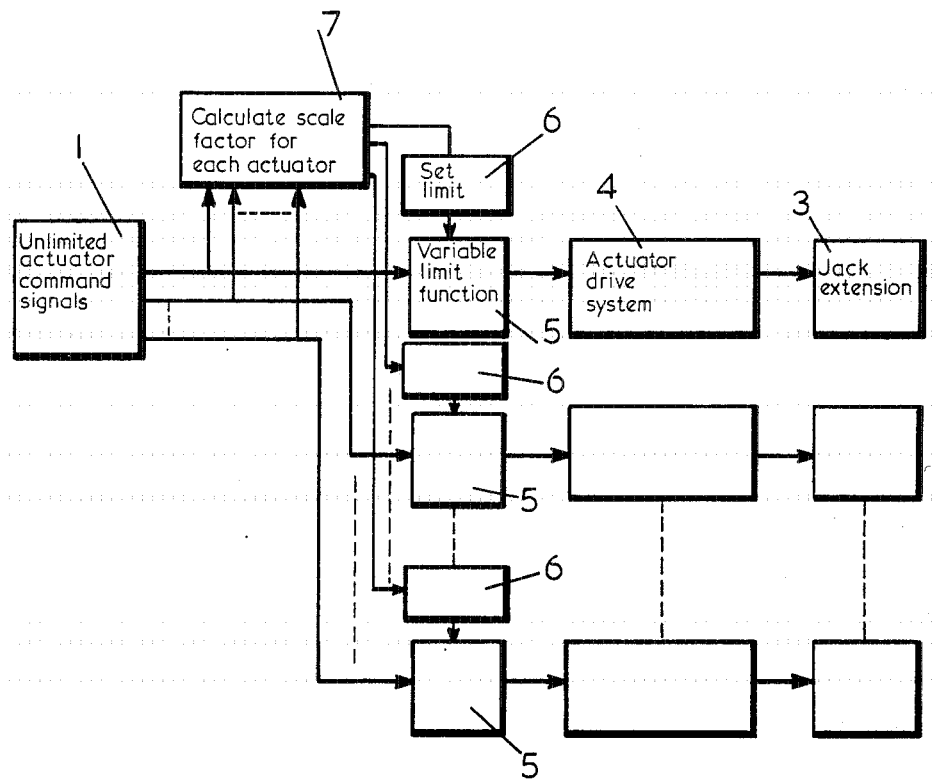
FIGS. 8 and 9 are schematic illustrations of two embodiments of the present invention.

FIG. 8 schematically illustrates a first embodiment of the invention. Equivalent elements in FIGS. 7 and 8 are identified by the same reference numerals. It will be noted that the fixed limit function generator 2 of FIG. 7 is replaced by a variable limit function generator 5 controlled by a limit setting signal generator 6. A scale factor calculator 7 monitors each of the command signal outputs from the controls 1, detects the largest command signal, sets the maximum limit for the jack to which the largest command signal relates, and scales down the limits of the other jacks in proportion to the ratio between the maximum limit and the largest command signal. Obviously if the largest command signal represents an action which will not exceed the maximum limit no scaling down of the limits is necessary.

Figure 9:
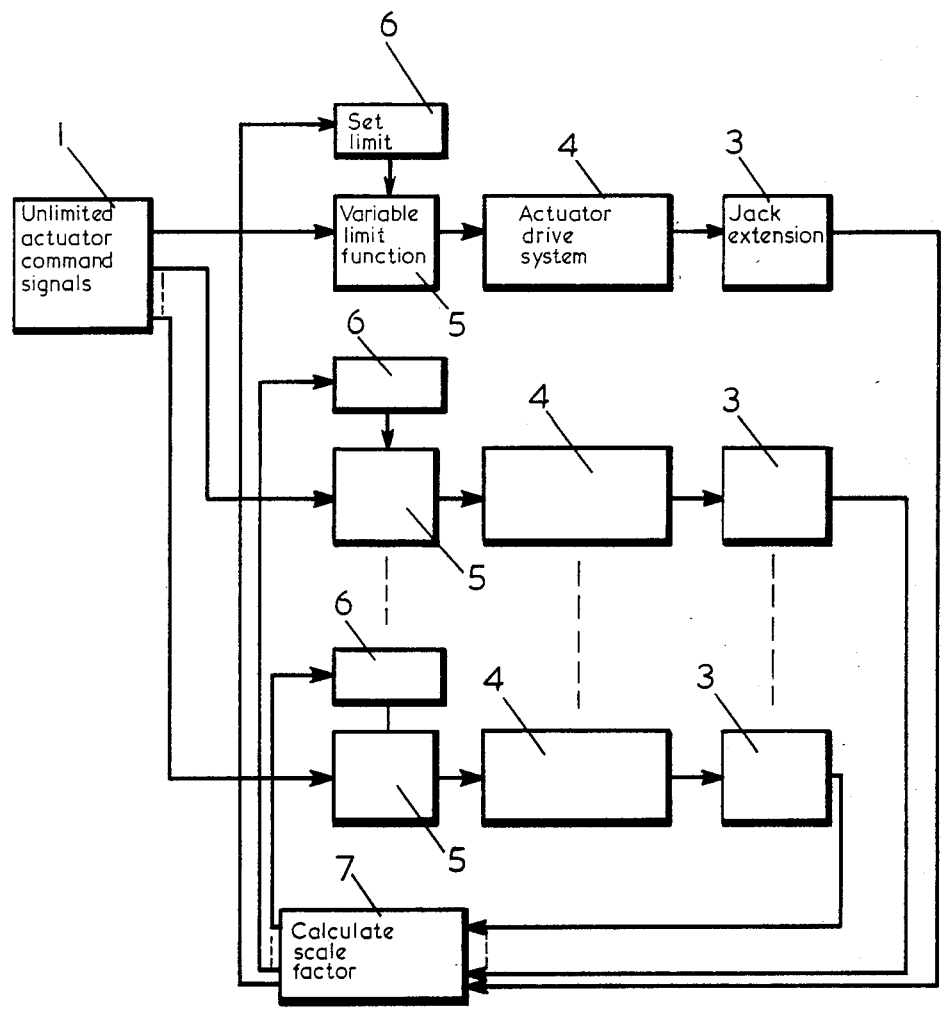

FIG. 9 schematically illustrates a second embodiment of the invention in which the limits are set is direct dependence upon the position and/or velocity of the jacks rather than upon the command signals. Equivalent elements of FIGS. 8 and 9 carry the same reference numerals. It will be noted that the scale factor calculator is connected to outputs derived from the jacks 3 rather than to the outputs of the controls 1.

The operation of the embodiments of FIGS. 8 and 9 is essentially the same in that instead of each jack actuator being at a different point on the same limit function as in the prior art of FIG. 7, each actuator is at the same point on a scaled limit function. Thus all actuators enter non-linear limit regions together and the correct platform attitude is maintained in response to linear motion commands. The platform is still free however to change its attitude in response to the appropriate commands.

It is already conventional practice to control the movements of an aircraft simulator by computer and it is therefore a relatively simple matter to incorporate the procedures of the present invention into the computer programme. The same procedures could however also be implemented by mechanical and hard-wired electrical devices directly connected to the motion system.

The above description of embodiments of the invention has assumed that each jack in the motion system has the same length of stroke and maximum velocity. This is not always the case and where it is not it is obviously necessary to consider not the numerical magnitudes of the parameters being monitored but to look rather at the relative magnitudes of these parameters when compared with the absolute limits within which they must be maintained.

The above description of embodiments of the invention has considered jack position and velocity as independent parameters. If one is concerned to limit both of these parameters however they may be handled by a single procedure. This can be done by looking at the extensions of the jacks periodically (increments per period), the change in jack extension per period being a measure of jack velocity. This enables the velocity limits to be set. The jack extension may be updated with the increments per period to provide a measure of jack extension. Thus knowledge of increments per period makes it possible to set up limits for both jack extension and jack velocity.

What I claim is:

1. A system for limiting the motion of the motion platform of a vehicle simulator in which the motion platform is supported on a plurality of extensible members which are simultaneously moved to change platform position or velocity or acceleration, the movement of the members for achieving these changes being controlled by commands initiated by a user of the simulator, comprising means for determining at least one absolute limit for at least one parameter of the extension of each of the members, and means for maintaining said at least one parameter within said at least one limit, characterised by means for monitoring the commanded or actual magnitude of said parameter in respect of each member relative to the said absolute limit for that member, means for determining the member for which the monitored relative magnitude is the greatest; calculating means for scaling down the said absolute limit determined for each of the other members to produce separate respective control signals for the separate extensible members such that a movement of the motion platform which causes said parameter for any one member to reach its absolute limit also causes each of the other members to reach its scaled down limit at the same time, and an actuator drive system for each extensible member responsive to respective ones of the control signals for controlling the motion of said motion platform with all extensible members moving at interrelated increments per period of time causing them to reach the maximum extension limits at the same time.

2. A system according to claim 1, wherein said parameter is the positional extension of the member.

3. A system according to claim 1, wherein said parameter is the velocity of extension of the member.

4. A system according to claim 1, comprising in respect of each extensible member a variable limit function generator the output of which controls an actuator drive system for the respective member, means for calculating a scale factor for each member, and means controlled by the calculating means for controlling each of the function generators.

5. A system according to claim 4, wherein the calculating means is connected to an actuator command signal source responsive to the controls of the simulator.

6. A system according to claim 4, wherein the calculating means is connected to outputs of the extensible members indicative of said parameter.

7. A method for limiting the motion of the motion platform of a vehicle simulator in which the motion platform is supported on a plurality of extensible members movable simultaneously to effect changes of platform position, velocity or acceleration, the movement of the members being controlled by commands initiated by a user of the simulator to indicate movement to a position defined by the absolute limiting position for each of the extensible members, wherein at least one absolute limit is determined for at least one parameter of the extension of each of the members, and said at least one parameter is maintained within said at least one limit, characterised in that (1) the magnitude of said parameter is monitored, (2) calculations are made to derive commands for scaling movement of each member to reach the said absolute limit for that member at the same time as the member for which the monitored magnitude is determined, with the said scaled absolute limit determined for each of the members such that a movement of the motion platform which causes said parameter for any one member to reach its absolute limit also causes each of the other members to reach its scaled down limit at the same time, and (3) the respective ones of the extensible members are controlled in response to said commands thereby to move the members in interrelated increments per period of time causing them to reach said limiting positions at the same time.

* * * * *